Figure 1:
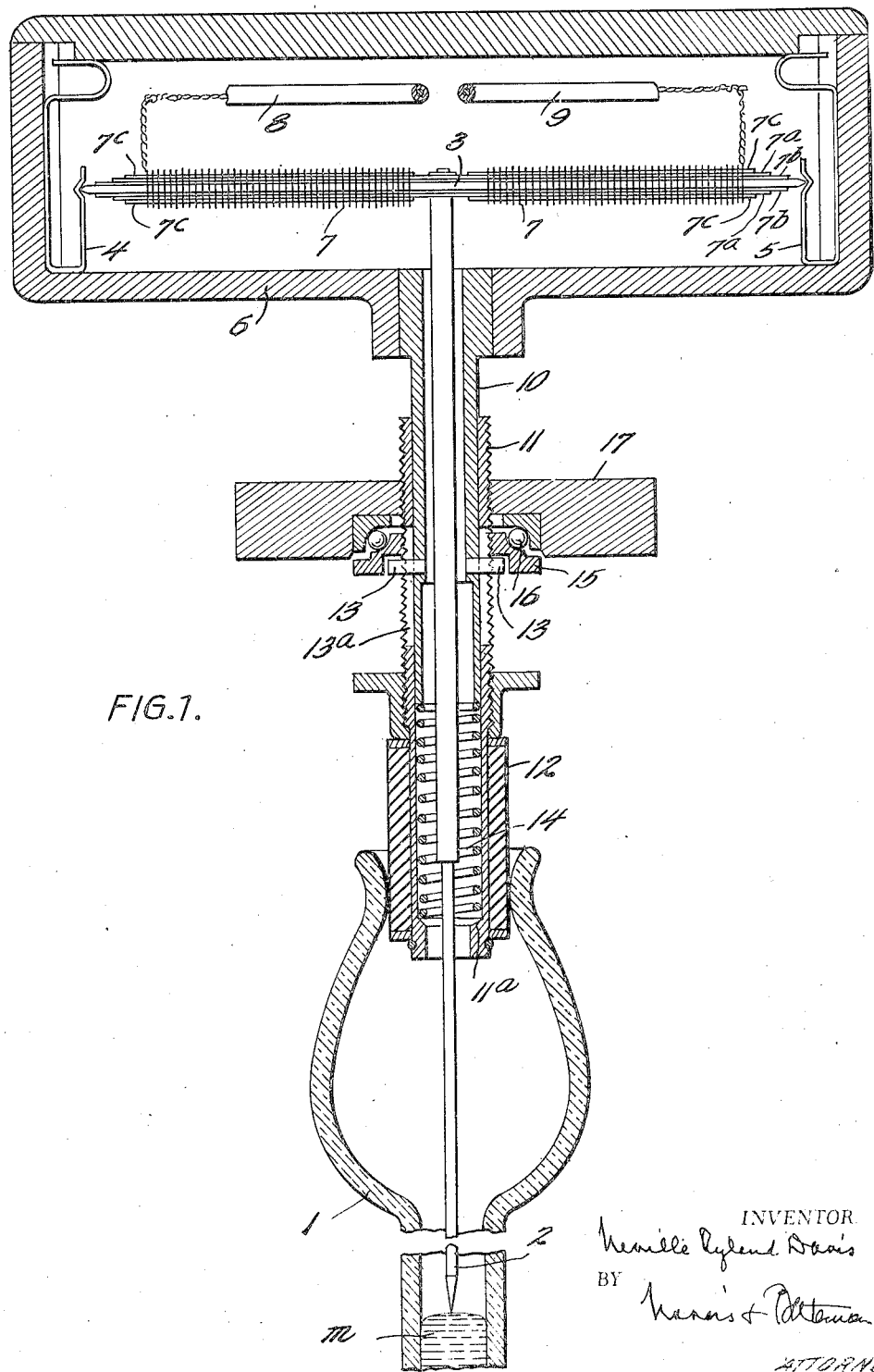

Sept. 6, 1949. N. R. DAVIS 2,481,401
ELECTRICAL TEMPERATURE REGULATING APPARATUS
Filed Nov. 30, 1945 2 Sheets-Sheet 1

INVENTOR
Neville Ryland Davis
BY
ATTORNEYS

Patented Sept. 6, 1949

2,481,401

UNITED STATES PATENT OFFICE 2,481,401

ELECTRICAL TEMPERATURE REGULATING APPARATUS

Neville Ryland Davis, Bisham, England, assignor to Sun-Vic Controls Limited, London, England, a company of Great Britain Application November 30, 1945, Serial No. 632,031
In Great Britain November 3, 1944

Section 1, Public Law 690, August 8, 1946
Patent expires November 3, 1964

16 Claims. (Cl. 171—330)

This invention relates to electrical temperature regulating apparatus and particularly to such apparatus of the kind generally known as toluene regulators, namely in which a bulb containing toluene or other suitable liquid is located in thermal relation with the mass the temperature of which is to be regulated, the lower part of said bulb containing mercury and communicating with a tube so that the mercury will be displaced to a height within said tube dependent upon the volume of the toluene within the bulb and therefore dependent upon said temperature. A cooperating contact is engaged by the mercury at a predetermined temperature whereby an electric circuit controlling the heat input to the furnace is completed, this circuit being arranged to reduce said heat input to zero or a lower value than that obtaining when said contacts are open, whereby to tend to maintain said temperature at a predetermined desired value. Regulators of this kind have, for example, a useful application for maintaining at a desired value the temperatures of calibrating and like baths in industrial processes.

Toluene regulators are extremely sensitive to temperature changes but heretofore it has been difficult in practice to utilise this extreme sensitivity since as a result of the large heat capacity of the bulb of the regulator the rate at which the temperature changes in response to engagement or disengagement of the mercury with the fixed contact must be made as small as possible if fine regulation of the temperature is to be obtained, that is to say in order to prevent large periodic fluctuation of said temperature about the desired value. As a consequence it is in practice necessary that the heat input to the regulated mass obtained when the mercury disengages the contact shall be adjusted each time the desired temperature of said mass is to be changed. Furthermore it is not possible to effect a close adjustment since the operating conditions will be too widely affected by inevitable fluctuations in the heat supply for the bath or other load such as by variation of the voltage of the electrical supply mains in the case of an electrically heated mass, and also due to fluctuations in ambient temperature.

With a view partially to overcoming the limitations above referred to it has been a common practice to provide an auxiliary heater adjacent the bulb of the toluene regulator, this auxiliary heater being energised when the mercury disengages the contact so that the operation of said contact in response to rise and fall of the regulated temperature will be accelerated. This practice is, however, subject to the objection that it introduces a large error in the regulated temperature with change of load where rapid operation is required since the thermal capacity of the bulb still determines the rate of change of position of the mercury in relation to the co-operating contact.

It may be noted that in 1890 Gouy noticed that the operation of toluene regulators might be improved by oscillating the contact with respect to the mercury, but the arrangements proposed by Gouy for mechanically oscillating the contact were complicated and undesirably complex for practical application.

The present invention has for its object to provide means whereby the several limitations and disadvantages above referred to may be overcome in a simple and effective manner.

According to the present invention, an electrical regulator of the kind referred to is provided with a thermal element connected with means adapted to effect relative movement between the mercury and the co-operating contact member in response to change in temperature of said element, with heating means for said thermal element connected or adapted to be connected in an energising circuit under control of engagement of said contact member with the mercury, such that opening of the circuit through said contact member and the mercury will cause reclosure of said circuit by changing the temperature of said thermal element. By this simple means the contacts are maintained in a state of oscillation, which oscillation as noted by Gouy improves the operation of the regulator and removes the limitations hereinbefore referred to. The arrangement has also the further advantage that the mean input to the regulated mass, or in other words the restoring effect on the regulated temperature when the latter departs from the desired value, will be proportional to, or will vary in dependence upon, the extent of said temperature departure.

Conveniently in carrying out the invention, the thermal element is connected with the contact member so as to displace said contact member with respect to the mercury in response to change of temperature of said element. The thermal element may conveniently be provided with a heater connected across a heating or controlling element for applying heat to produce the temperature to be regulated under control of the contact member and mercury, that is to say said heater may be connected directly across a heating element or elements for the regulated mass where the latter is heated electrically or directly across a controlling winding adapted such as by means of a fuel control valve to govern the input to the regulated mass where the latter is otherwise heated such as by oil or gas fuel.

As in an embodiment of the invention hereinafter specifically described, the invention also provides, according to another aspect thereof, a regulator of the kind referred to arranged as a unitary assembly comprising in combination with a contact member adapted to co-operate with mercury in a tube communicating with an enclosure containing toluene or the equivalent, a thermal element interposed between said contact member and a supporting structure locating or adapted to locate said member with respect to said tube, and heating means for said thermal element connected or adapted to be connected in an electric circuit arrangement with said contact member so that in operation said thermal element in response to the establishment of a circuit through said contact member and the mercury will withdraw the contact member from the mercury and in response to said withdrawal will bring the contact member into engagement with the mercury, whereby to provide the operation above described.

Preferably the thermal element comprises a bimetal element although other forms of element may be employed in carrying the invention into effect. Means may be provided for compensating the thermal element for variations of ambient temperature. For this purpose the said element may comprise a bimetal element consisting of a portion arranged to be heated under control of the regulator, connected at its ends with the two ends respectively of another portion of said element, and having intermediate points of each of said portions connected for effecting displacement between the contact member and the mercury in accordance with the differential deflection of said two portions.

Figure 2:
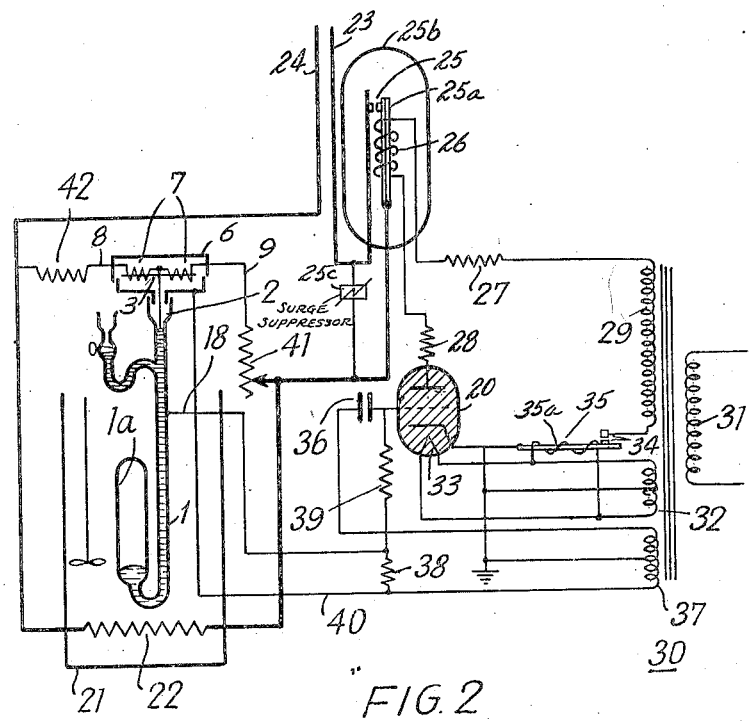
Figure 3:
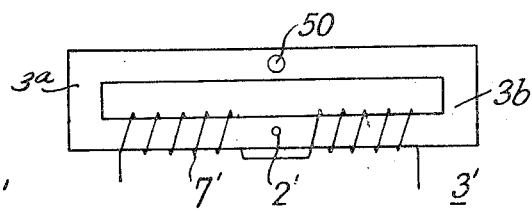

Reference will now be made by way of example to the accompanying drawings, in which Fig. 1 is a sectional side elevation of a preferred arrangement of regulator according to the invention, Fig. 2 is an electrical diagram showing a preferred circuit arrangement controlling a regulated enclosure by means of the regulator of Fig. 1, Fig. 3 is a plan view of a modified form of bimetal element which may be employed in the regulator of Fig. 1.

Figure 4:
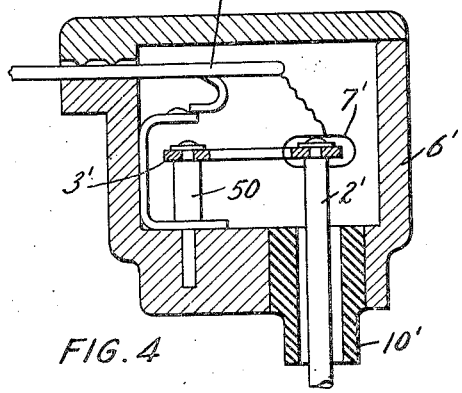

Fig. 4 is a transverse vertical section of the casing and of the structure shown in Fig. 3 mounted therein.

Referring first to Fig. 1, the regulator comprises an assembly to be hereinafter described which in use is mounted in place at the upper end of a tube 1 communicating at its lower end with a bulb, not shown in Fig. 1, but indicated at 1a in Fig. 2. As can be seen from Fig. 2 this tube houses a quantity of mercury m whilst the bulb 1a contains toluene so that the dependence of the volume of the toluene on the temperature of the bulb 1a will cause the mercury to rise to a corresponding variable height at the upper end of the tube 1. The regulator comprises a contact rod 2 mounted in the assembly and positioned so that when the regulated temperature reaches a required value the upper surface of the mercury within the tube 1 will reach the lower end of the contact rod 2 so that an electric circuit is established between said rod and mercury and is employed to control the heat input to the regulated mass. The contact rod, instead of being fixedly mounted in the assembly, is secured at its upper end to the centre point of a bimetal strip 3 which is formed at its two ends with knife edges located in spring blade supports 4 and 5 within a casing 6. The bimetal element carries a heating winding 7 which is connected with leads 8 and 9. Preferably electrostatic shields of copper or the like are mounted on the two major faces of the bimetal strip between the latter and the heating winding 7 whereby to avoid electrostatic interference between the circuit including the heating coil and the circuit controlled by the contact rod. These shields are shown at 7a, they being in the form of strips insulated from the bimetal strip 3 by interposed mica strips 7b with further mica strips 7c interposed between the shields and the heating wire 7.

The casing 6 is secured to the upper end of a tubular member 10 which is a close sliding fit within an externally threaded sleeve 11 surrounded at its lower end by a rubber bush 12 by which the regulator device is registered within the top of the tube 1. The tube 10 has mounted therein a pair of radial pins 13 disposed diametrically opposite one another and extending through slots 13a in the sleeve 11. The tube 10 is biased upwardly by means of a helical compression spring 14 abutting at its lower end in an internal flange 11a of the tube 11 and abutting at its upper end on the lower end of the tube 10. The pins are engaged by slots in a bearing ring 15 the thrust of which is transmitted through a ball-bearing 16 to an adjusting nut 17 received on the threaded external surface of the tube 11. By this means movement of the nut 17 will vary the vertical position of the tube 10 and casing 6 with respect to the tube 11 whereby to adjust the relative position of the contact rod 2 and the upper surface of the mercury.

In the application of the regulator according to Fig. 1, the heating winding 7 is connected in an electrical circuit so as to be controlled by engagement between the mercury and the contact rod 2 and in such manner that said engagement will terminate or reduce the current flowing in said winding and conversely when the mercury and rod 2 are out of contact with one another said circuit arrangement will increase the current flowing in said winding. The bimetal strip 3 is arranged to assume an upwardly concave formation upon heating so that the contact rod will be moved downwardly when the current in the heating winding is increased. It will be understood that the tube 1 is provided with a suitable lead wire such as shown at 18 in Fig. 2, immersed in the mercury.

One suitable circuit arrangement for controlling the regulated enclosure and the bimetal strip will now be described by way of example with reference to Fig. 2 and the operation of arrangements according to the invention will then be described with reference to this particular embodiment.

As shown in Fig. 2 the electrical circuit arrangement comprises a gaseous discharge electronic tube 20 which as will be described operates as a relay the input circuit of which is controlled by the regulator and the output circuit of which controls the heat input to an enclosure 21 such as for example an electrolytic bath, and in the arrangement shown to an enclosure which is electrically heated by means of a heating element 22.

The heating element 22 is connected with supply mains 23, 24 through the normally open contacts 25 of a main relay, which is conveniently of the vacuum type, comprising a bimetal strip 25a mounted with the contacts 25 within an evacuated envelope 25b, the bimetal strip 25a being provided with a heating winding 26 which is connected in series with a pair of fixed resistors 27 and 28 in the anode circuit of the electronic tube 20, which in this embodiment is a Thyratron. In the usual manner the anode circuit of this Thyratron is supplied from one secondary winding 29 of a transformer 30, the primary winding 31 of which is connected across the supply mains 23, 24, and another secondary winding 32 of which transformer supplies the cathode heater 33 of the Thyratron. The anode circuit includes the contacts 34 of a time delay relay the heating winding 35 for the bimetal strip 35a of which is connected across the winding 32 so that voltage is not applied to the anode of the Thyratron until the cathode reaches its operating temperature. The contacts 25 of the main relay may be shunted by a surge suppressor 25c in the form of a capacitance or a non-linear resistor, that is, a resistor the resistance of which decreases in an exponential manner with increase of applied voltage.

The grid of the Thyratron is connected through a fixed condenser 36 with one end of a third secondary winding 37 of the transformer, a centre tapping of said winding 37 being connected with the cathode of the Thyratron as shown. The other end of the winding 37 is connected with the grid through a pair of resistors 38 and 39. The parameters of the circuit are chosen such that the voltage applied between the grid and cathode by the winding 37 will normally render the Thyratron conducting. The resistor 38 has its ends connected respectively with the lead wire 19 and thereby with the mercury of the regulator, and, through a conductor 40 with one of the spring blades 4 or 5 and thereby with the bimetal element and the contact rod 2. When the mercury engages the contact wire the resistor 38 will thus be short-circuited and the arrangement is such that the phase and magnitude of the voltage between the grid and cathode of the Thyratron will terminate the anode current of the Thyratron.

The heating winding 7 of the regulator is connected across the heating winding 22 in series with resistors 41 and 42. One or both of the resistors 41 and 42 may conveniently be adjustable for obtaining optimum operating conditions, it being understood, however, that the adjustment just above referred to will not normally be disturbed during operation but is preset during the installation of the apparatus.

In the operation of the arrangement shown in Fig. 2, when the regulated temperature is below the desired value the Thyratron conducts current to close the main relay contacts 25 and supply current to the heating element 22. When the regulated temperature rises to a predetermined value the mercury will be forced by the vapour pressure of the toluene within the bulb 1a into contact with the contact rod 2 whereby the Thyratron is rendered non-conducting and the contacts 25 open to de-energise the heating element 22. Simultaneously the heating winding 7 of the regulator will be de-energised so that the temperature of the bimetal strip 3 will fall from the value previously pertaining. The time constant of the bimetal strip is chosen such that said strip will then rapidly lift the contact rod out of engagement with the mercury so that the Thyratron is again rendered conducting to close the contacts 25 and again supply current to the heating element 22. At the same time current is again supplied to the heating winding 7 and the bimetal strip moves the contact rod downwardly to re-engage the mercury and thereby repeat indefinitely the cycle of operations above described.

It will be seen that with the arrangement according to the invention the contact rod is maintained in a state of intermittent engagement with the mercury for any given value of the regulated temperature and consequently the heater 22 is intermittently energised for any given value of the regulated temperature. The time period required for opening of the regulator contacts by the bimetal strip is dependent on the time constant of said strip and is not affected by the thermal capacity of the toluene bulb as in the previous arrangements hereinbefore referred to, whereby the limitations hereinbefore referred to are avoided.

For any given value of the regulated temperature and corresponding position of the mercury within the tube 1 there will be a corresponding proportion between the duration of the time periods for which the main relay contacts are closed and those for which said contacts are open so that the mean current supplied to the heater 22 will have a corresponding value. This value of the mean current varies with the regulated temperature, becoming greater should the regulated temperature fall below the desired value. This operation results from the fact that as the height of the mercury within the tube falls, the bimetal strip must be heated to a higher temperature before the contact rod engages with the mercury so that current must flow in the heating winding 7 of said strip for longer periods. Since the temperature rise of the bimetal strip has a non-linear relation to the average value of current in the heating winding therefor, the periods during which the bimetal heating winding is de-energised will become smaller as the height of the mercury falls.

It will be clear from the above that the regulated temperature is determined by the mean vertical position of the contact rod within the tube 1 and as described the arrangement of Fig. 1 provides means whereby a fine setting of this position and therefore of the regulated temperature may be obtained.

In some cases it may be desired to compensate the operation of the regulator against variations of ambient temperature and for this purpose a further thermally responsive element operating in opposition to the bimetal strip referred to may be employed as is otherwise well known with thermally operated devices. Figs. 3 and 4 show a simple arrangement for providing such temperature compensation, in an apparatus otherwise similar to that shown in Figs. 1 and 2 but employing a bimetal element 3' in the form of an elongated rectangular frame the end portions 3a and 3b of which are unconstrained. The contact rod 2' is secured to the centre of the elongated side of the frame having the heating winding 7' thereon, and the frame is mounted in the housing 6' by a support 50 at the centre of the other elongated side of the frame.

What I claim as new and desire to secure by Letters Patent of the United States is:

1. An electrical temperature regulator comprising in combination a mercury system communicating with an enclosure for a temperature expansible fluid, a contact in operative position for engagement by mercury displaceable in said system according to the volume of said fluid, means including a thermally responsive element for effecting relative displacement between said contact and mercury in response to change of temperature of said element, and a heating circuit for said element controlled by said contact, said element being operative in response to circuit closure between said contact and said mercury to effect separation of said contact and mercury, and to maintain intermittent circuit closure between said contact and mercury with a percentage time of said engagement dependent on the mean position of the mercury and therefore on the volume of said fluid and on the magnitude of the regulated temperature.

2. A toluene regulator head comprising in combination a base member, a tube containing mercury displaceable by a temperature expansible fluid in a system communicating with said tube, securing means for attachment of the base member to the tube, a contact member movably mounted on said base member and projecting from the latter in the direction of said securing means, a thermally responsive element having operative parts connected respectively with said base member and said contact, and a heating circuit for said element connected under control of said contact, said thermally responsive element being operative to move said contact away from and into engagement with said mercury in response to engagement and separation of the contact and mercury, respectively, and to maintain intermittent circuit closure between said contact and mercury with a percentage time of said engagement dependent on the mean position of the mercury and therefore on the volume of said fluid and on the magnitude of the regulated temperature.

3. A toluene regulator head comprising in combination a base member, a tube containing mercury displaceable by a temperature expansible fluid in a system communicating with said tube, securing means for attachment of the base member to the tube, a contact member movably mounted on said base member and projecting from the latter in the direction of said securing means, a bimetal element having operative parts connected respectively with said base member and said contact, and a heating circuit for said element under control of said contact, said bimetal element being operative to move said contact away from and into engagement with said mercury in response to engagement and separation of the contact and mercury, respectively, and to maintain intermittent circuit closure between said contact and mercury with a percentage time of said engagement dependent on the mean position of the mercury and therefore on the volume of said fluid and on the magnitude of the regulated temperature.

4. An electrical temperature regulator comprising in combination a mercury system communicating with an enclosure for a temperature expansible fluid, a contact in operative position for engagement by mercury in said system under control of the volume of said fluid, a bimetal element operatively connected with said contact for displacing the latter with respect to the mercury in accordance with deflection of said bimetal element, and a heating circuit for said element under control of said contact, said element being operative in response to circuit closure between said contact and said mercury to withdraw the contact from the mercury so as to maintain intermittent circuit closure between said contact and mercury with a percentage time of said engagement dependent on the mean position of the mercury and therefore on the volume of said fluid and on the magnitude of the regulated temperature.

5. An electrical temperature regulator comprising in combination a mercury system communicating with an enclosure for a temperature expansible fluid, a contact in operative position for engagement by mercury displaceable in said system according to the volume of said fluid, means including a thermally responsive element for effecting relative displacement between said contact and mercury in response to change of temperature of said element, electronic relay means having an input circuit including said contact and an output circuit for controlling the regulated temperature, and a heating circuit for said thermally responsive element included in the output circuit of said relay, said element being operative in response to circuit closure between said contact and mercury to effect separation of said contact and mercury and to maintain intermittent circuit closure between said contact and mercury with a percentage time of said closure dependent on the mean position of the mercury and therefore on the volume of said fluid and on the magnitude of the regulated temperature.

6. An electrical temperature regulator as defined in claim 5, wherein said electronic relay means comprises a grid-controlled phase responsive gaseous conduction discharge device.

7. An electrical temperature regulator comprising in combination a mercury system communicating with an enclosure for a temperature expansible fluid, a contact in operative position for engagement by mercury displaceable in said system according to the volume of said fluid, a circuit element for controlling the application of heat to produce the temperature to be regulated, connected under control of said contact and mercury, means including a thermally responsive element for effecting relative displacement between said contact and mercury in response to change of temperature of said element, and a heating circuit for said element connected across said circuit element, said thermally responsive element being operative in response to circuit closure between said contact and said mercury to effect separation of said contact and mercury, and to maintain intermittent circuit closure between said contact and mercury with a percentage time of said engagement dependent on the mean position of the mercury and therefore on the volume of said fluid and on the magnitude of the regulated temperature.

8. An electrical temperature regulator comprising in combination a mercury system communicating with an enclosure for a temperature expansible fluid, a contact in operative position for engagement by displacement of mercury in said system according to the volume of said fluid, a thermally responsive element mechanically connected with said contact to move said contact relatively to said mercury in response to change of temperature of said element, electronic relay means having an input circuit including said contact and an output circuit for controlling the regulated temperature, a heating element in thermal relation with said thermally responsive element and included in a circuit under control of said relay, said thermally responsive element being operative in response to circuit closure between said contact and mercury to effect separation of said contact and mercury and to maintain intermittent circuit closure between said contact and mercury with a percentage time of said closure dependent on the mean position of the mercury and therefore on the volume of said fluid and on the magnitude of the regulated temperature, and electrostatic shielding means located between said heating element and said thermally responsive element.

9. An electrical temperature regulator comprising in combination a mercury system communicating with an enclosure for a temperature expansible fluid, a contact in operative position for engagement by mercury displaceable in said system according to the volume of said fluid, means including a thermally responsive element for effecting relative displacement between said contact and mercury in accordance with deflection of said thermally responsive element, and means responsive to ambient temperature acting on said contact in opposition to said thermally responsive element, and a heating circuit for said element controlled by said contact, said element being operative in response to circuit closure between said contact and said mercury to withdraw the contact from the mercury and to maintain intermittent circuit closure between said contact and mercury with a percentage time of said engagement dependent on the mean position of the mercury and therefore on the volume of said fluid and on the magnitude of the regulated temperature, with said thermally responsive element compensated for variations of ambient temperature.

10. A toluene regulator head comprising in combination a base member, a tube containing mercury displaceable by a temperature expansible fluid in a system communicating with said tube, securing means for attachment of the base member to the tube, a contact member movably mounted on said base member and projecting from the latter in the direction of said securing means, a thermally responsive element having operative parts connected respectively with said base member and said contact member, a heating circuit for said element controlled by said contact member, and means responsive to ambient temperature acting on said contact member in opposition to said thermally responsive element, said element being operative to move said contact away from and into engagement with said mercury in response to engagement and separation of the contact and mercury, respectively, and to maintain intermittent circuit closure between said contact and mercury with a percentage time of said engagement dependent on the mean position of the mercury and therefore on the volume of said fluid and on the magnitude of the regulated temperature, with said thermally responsive element compensated for variations of ambient temperature.

11. A toluene regulator head comprising in combination a base member, a tube containing mercury displaceable by a temperature expansible fluid in a system communicating with said tube, securing means for attachment of the base member to the tube, a contact member movably mounted on said base member and projecting from the latter in the direction of said securing means, a bimetal element consisting of two portions connected each with the other at the two ends thereof, one of said portions being connected at an intermediate part thereof with said contact member and the other of said portions being connected at an intermediate point thereof with said base member, and a heating circuit for one of said bimetal portions of said element connected under control of said contact, said contact member being movable by differential deflection of said two bimetal portions away from and into engagement with said mercury in response to engagement and separation of the contact and mercury, respectively, and operative to maintain intermittent circuit closure between said contact and mercury with a percentage time of said engagement dependent on the mean position of the mercury and therefore on the volume of said fluid and on the magnitude of the regulated temperature with said bimetal element compensated for variations of ambient temperature.

12. A toluene regulator head comprising in combination a box-like base member, a tube containing mercury displaceable by a temperature expansible fluid in a system communicating with said tube, securing means projecting from the base member for attachment of the latter to the open end of the tube, a bimetal strip mounted within said base member, a contact member carried by a displaceable part of said bimetal strip and projecting from said base member through said securing means, and a heating winding located within said base member in thermal relation to said bimetal strip.

13. A toluene regulator head comprising in combination a box-like base member, a tube containing mercury displaceable by a temperature expansible fluid in a system communicating with said tube, securing means projecting from the base member for attachment of the latter to the open end of the tube, a bimetal strip mounted within said base member, a contact member carried by a displaceable part of said bimetal element and projecting from said base member through said securing means, a heating winding located within said base member in thermal relation to said bimetal strip, and means responsive to ambient temperature within said base member acting on said contact in opposition to said bimetal strip.

14. An electrical temperature regulator comprising in combination a toluene regulator head consisting of a base member, a tube containing mercury displaceable by a temperature expansible fluid in a system communicating with said tube, securing means for attachment of the base member to the tube, a contact member movably mounted on said base member and projecting from the latter in the direction of said securing means, a thermally responsive element having operative parts connected respectively with said base member and said contact, and a heating circuit for said element, and electronic relay means having an input circuit including said contact and an output circuit for controlling the application of heat to produce a temperature to be regulated, and having said heating circuit for the thermally responsive element also connected for energization in accordance with the output of said relay means, said thermally responsive element being operative to move said contact away from and into engagement with said mercury in response to engagement and separation of the contact and mercury, respectively, and to maintain intermittent engagement between said contact and mercury with a percentage time of said engagement dependent on the mean position of the mercury and therefore on the volume of said fluid and on the magnitude of the regulated temperature.

15. An electrical temperature regulator as defined in claim 14, wherein said electronic relay means comprises a grid-controlled phase responsive gaseous conduction discharge device.

16. An electrical temperature regulator comprising in combination a toluene regulator head consisting of a base member, a tube containing mercury displaceable by a temperature expansible fluid in a system communicating with said tube, securing means for attachment of the base member to the tube, a contact member movably mounted on said base member and projecting therefrom past said securing means, a thermally responsive element having operative parts connected respectively with said base member and said contact, and a heating element for said thermally responsive element, and electronic relay means having an input circuit including said contact and an output circuit for controlling the application of heat to produce a temperature to be regulated, and having said heating element for the thermally responsive element also connected for energization in accordance with the output of said relay means, said thermally responsive element being operative to move said contact away from and into engagement with said mercury in response to engagement and separation of the contact and mercury, respectively, and to maintain intermittent engagement between said contact and mercury with a percentatge time of said engagement dependent on the mean position of the mercury and therefore on the volume of said fluid and on the magnitude of the regulated temperature, and electrostatic shielding means located between said heating element and said thermally responsive element.

NEVILLE RYLAND DAVIS.

REFERENCES CITED

The following references are of record in the file of this patent:

UNITED STATES PATENTS

| Number | Name | Date |
| --- | --- | --- |
| 1,150,706 | Ryan | Aug. 17, 1915 |
| 1,542,850 | Curtis | June 23, 1925 |
| 1,844,071 | Newell | Feb. 9, 1932 |
| 1,950,780 | Brennan | Mar. 13, 1934 |
| 1,987,725 | Veinott | Jan. 15, 1935 |
| 1,996,569 | Byrnes | Apr. 2, 1935 |
| 2,016,244 | Gregory | Oct. 1, 1935 |
| 2,280,539 | Osswald | Apr. 21, 1942 |
| 2,368,313 | Malone | Jan. 30, 1945 |

OTHER REFERENCES

"Instruments" by Instruments Publishing Co., Pittsburgh, Pa., December 1937, page 305.